United States Patent
Yanagita et al.

(10) Patent No.: US 6,944,917 B2
(45) Date of Patent: Sep. 20, 2005

(54) CLIP FOR MOUNTING WEATHERSTRIP

(75) Inventors: Yousuke Yanagita, Utsunomiya (JP); Tomoo Eguchi, Tokyo (JP); Mamoru Kagawa, Wako (JP); Hiroyuki Sase, Wako (JP)

(73) Assignees: Nifco Inc., Yokohama (JP); Honda Giken Kogyo Kabushiki Kaisha, Tokyo (JP)

( * ) Notice: Subject to any disclaimer, the term of this patent is extended or adjusted under 35 U.S.C. 154(b) by 33 days.

(21) Appl. No.: 10/633,633

(22) Filed: Aug. 5, 2003

(65) Prior Publication Data

US 2004/0025440 A1 Feb. 12, 2004

(30) Foreign Application Priority Data

Aug. 6, 2002 (JP) ......................................... 2002-228992

(51) Int. Cl.$^7$ .............................. E06B 3/54; E04F 19/02; B60J 10/02
(52) U.S. Cl. ..................... 24/292; 52/208; 52/204.597; 52/204.62; 52/717.01; 52/716.7; 146/93; 146/96.21
(58) Field of Search ......................... 24/298, 291, 292; 52/208, 204.591, 204.597, 204.62, 717.01, 716.5, 716.6, 718.01, 718.04; 296/93, 96.21, 146.15; 49/492.1, 489.1, 483.1, 493.1, 479.1

(56) References Cited

U.S. PATENT DOCUMENTS

| 2,793,071 A | | 5/1957 | Meyer |
| 3,245,182 A | | 4/1966 | Zierold |
| 3,274,740 A | | 9/1966 | Hall |
| 3,413,770 A | * | 12/1968 | Adams ......................... 52/208 |
| 3,783,568 A | | 1/1974 | Adler et al. |
| 4,197,688 A | * | 4/1980 | Mauer .......................... 24/292 |
| 4,332,412 A | * | 6/1982 | Nakazawa et al. ............ 296/29 |
| 4,379,379 A | * | 4/1983 | Sengoku ....................... 52/208 |
| 4,412,406 A | * | 11/1983 | Sengoku ....................... 52/208 |
| 4,873,803 A | * | 10/1989 | Rundo .......................... 52/202 |
| 5,139,302 A | * | 8/1992 | Kanke .......................... 296/93 |
| 5,267,415 A | * | 12/1993 | Vaughan ....................... 49/377 |
| 6,282,840 B1 | * | 9/2001 | Vance .......................... 49/377 |

FOREIGN PATENT DOCUMENTS

| CH | 623 104 | 5/1981 |
| DE | 1 001 128 | 1/1957 |
| DE | 36 16 468 | 11/1987 |

* cited by examiner

Primary Examiner—Robert Canfield
(74) Attorney, Agent, or Firm—Manabu Kanesaka

(57) ABSTRACT

A clip for mounting a weatherstrip between an end side of a window and a window frame includes: a weatherstrip side member having arms for engaging the weatherstrip and tabular engagement pieces extending from a base portion of the arms; and a window frame side member including box-shape holding portions for allowing the tabular engagement pieces to slide therein and an attachment device, i.e. T stud attachment portion and a double-sided tape, for attaching to the window frame. An engagement device is provided between the engagement pieces and the holding portions, and is formed of claws provided on one of the engagement pieces and holding portions and holes provided on the other. The weatherstrip side member and the window frame side member can be separately formed, and easily combined.

11 Claims, 2 Drawing Sheets

US 6,944,917 B2

CLIP FOR MOUNTING WEATHERSTRIP

BACKGROUND OF THE INVENTION AND RELATED ART STATEMENT

The present invention relates to a clip for mounting a weatherstrip in order to attach the weatherstrip between an end surface of a window and a surface of a window frame opposite to the end surface.

Conventionally, a weatherstrip is generally mounted between a side end surface of a front window shield of an automobile and a window frame surface of a windshield pillar opposite to the side end surface for both sealing and decoration. In order to mount the weatherstrip on the auto body side, a clip formed of a synthetic resin has been used.

A known method for mounting the clip on the auto body includes a method in which a stud pin (hereinafter referred to as a T stud) including an expanded head portion projecting on the auto body side (refer to Japanese Utility Model No. 07-22329), or a method using a double-sided adhesive tape (refer to Japanese Utility Model No. 02-11211). These methods have been selected according to a situation, and sometimes according to a location in the same type of vehicle.

In the case of using the double-sided adhesive tape, it is preferable to use a thermoset adhesive with a high adhesion strength. However, in general, a synthetic resin does not have enough heat resistance to withstand heat for curing the adhesive. Accordingly, the clip needs to be made of metal. Therefore, it is not possible to use a clip using the T stud and a clip using the adhesive together, and it is difficult to satisfy a demand for reducing the number of parts to simplify part management.

The present invention has been made in order to solve the above mentioned problems of the conventional technology, and an object of the invention is to provide an improved clip for mounting the weatherstrip so that the clip can be attached with both the T stud and the adhesive.

Further objects and advantages of the invention will be apparent from the following description of the invention.

SUMMARY OF INVENTION

In order to achieve the above-mentioned objects, according to the first aspect of the present invention, a clip for mounting a weatherstrip between an end portion of a window and a window frame includes: a weatherstrip side member having an arm for engaging the weatherstrip and an engagement piece extending from a base portion of the arm; and a window frame side member having a box-shape holding portion slidably attached to the engagement piece and attachment means (T stud attachment portion, double-sided tape) for attaching to a surface of the window frame. Engagement means having a claw provided on one of the engagement piece and holding portion and a hole provided on the other of the engagement piece and holding portion is provided between the engagement piece and the holding portion.

With this configuration, the weatherstrip side member and the window frame side member can be formed separately, and it is easy to combine them. Therefore, it is possible to change a material of the two members without complicating an assembling process.

Further, according to the second aspect, the attachment means for attaching the window frame side member to the window frame surface is formed of the double-sided adhesive tape and an attachment portion projecting from the window frame surface for connecting the T stud. With this configuration, when the window frame side member is formed of a material with high heat resistance, it is possible to use both the thermoset adhesive and the T stud.

According to the third aspect, a clip for mounting the weatherstrip between the end portion of the window and the window frame includes: a weatherstrip side member having an arm for engaging the weatherstrip and an engagement piece extending from a base portion of the arm; a window frame side member having a box-shape holding portion slidably attached to the engagement piece and attachment means (T stud attachment portion, double-sided tape) for attaching to a surface of the window frame. The attachment means for attaching the window frame side member to the window frame surface includes the double-sided adhesive tape and an attachment portion with the T stud projecting from the window frame surface.

With this configuration, the weatherstrip side member and the window frame side member are formed separately with different materials. Further, the window frame side member is made of a material with high heat resistance, so that both thermoset adhesive and T stud can be used together.

According to the fourth aspect, engagement means having a claw provided on one of the engagement piece and holding portion and a hole provided on the other is provided between the engagement piece and the holding portion, so that both can be easily combined.

According to the fifth aspect, the claws provided between the engagement piece and the holding portion are provided at multiple positions in a moving direction when the engagement piece slides relative to the holding portion. With this configuration, the claws can correspond easily to a difference in sizes between the engagement position for the weatherstrip and the attachment position for the window frame.

According to the sixth aspect, a projection is formed at an end of the window frame side member in a longitudinal direction, and elastically abuts against the window frame surface. A size of the projection projecting from a surface opposite to the window frame surface is smaller than a thickness of the double-sided adhesive tape. With this configuration, rattle prevention means used when the T stud is fixed does not interfere when the double-sided adhesive tape is used.

According to the seventh aspect, a groove perpendicular to the longitudinal direction of the window frame is provided on at least one of the surfaces of the window frame side member parallel to the window frame surface. With this configuration, since it is possible to increase an ability of the window frame side member to bend in the longitudinal direction, it is possible to secure close attachment of the window frame side member relative to the window frame surface.

DETAILED DESCRIPTION OF PREFERRED EMBODIMENTS

Hereunder, the present invention will be described in detail with reference to the accompanying drawings.

Figure 1:
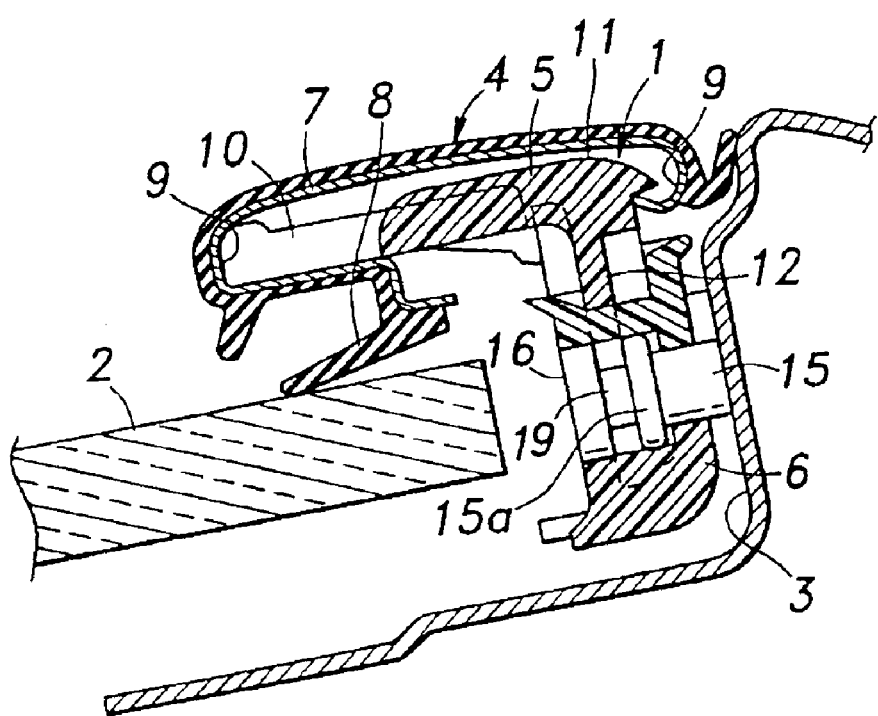
FIG. 1 is a cross sectional view of an intermediate part of a long side showing a use condition of a clip for mounting a weatherstrip of the present invention.
Figure 2:
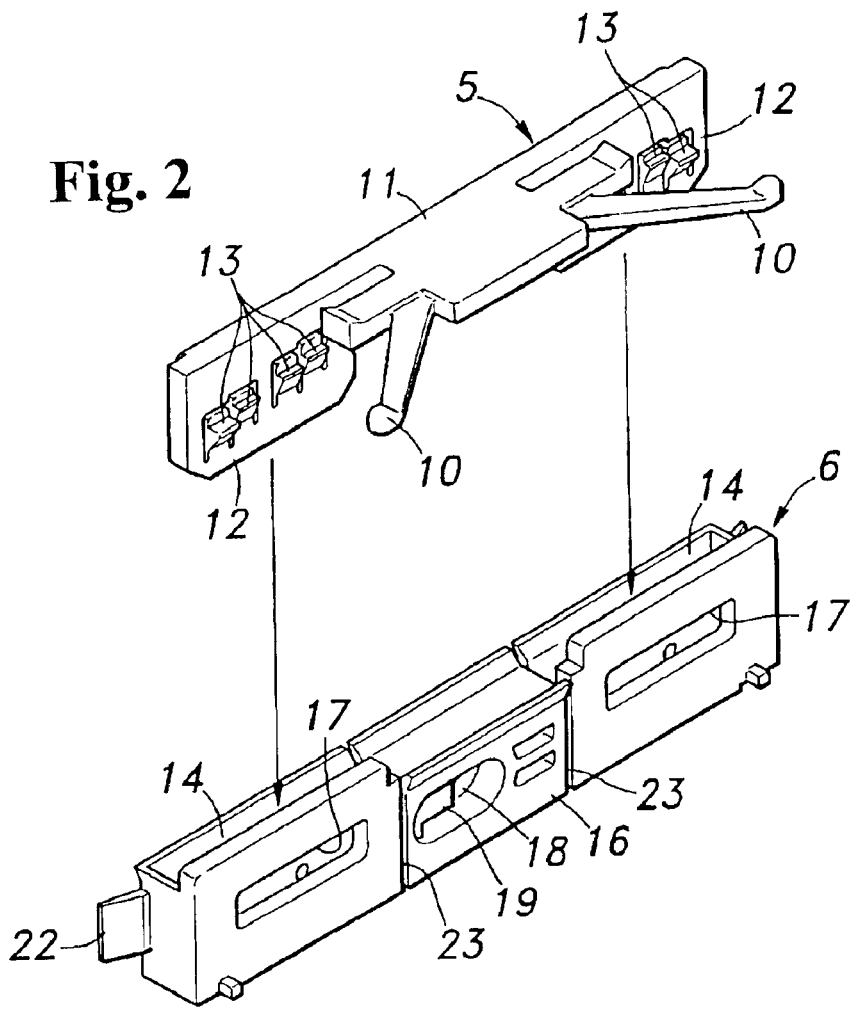
FIG. 2 is an external perspective view of the clip for mounting the weatherstrip of the present invention.
Figure 3:
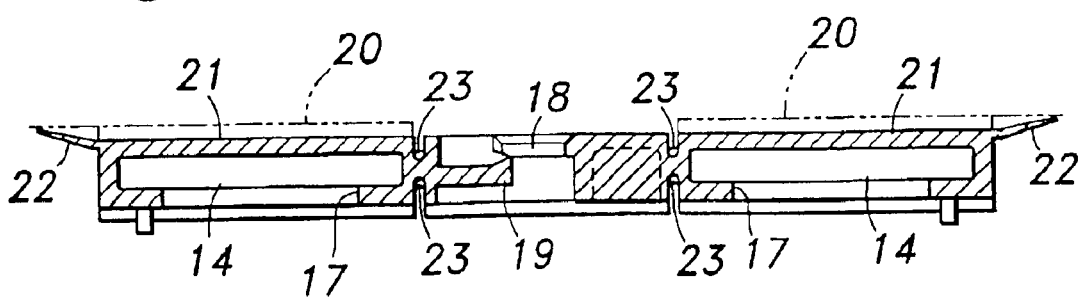
FIG. 3 is a cross sectional view along the long side of a window frame side member.

FIGS. 1–3 show a clip for mounting a weatherstrip according to the present invention. A clip 1 is constructed of two members, i.e. a weatherstrip side member 5 and a window frame side member 6. The clip 1 is used for mounting a weatherstrip 4 as a sealing and decoration member to a position between a side end surface of a front window shield 2 of an automobile and a window frame surface 3 of a front pillar opposite to the side end surface of the front window shield 2.

As shown in FIG. 1, in the weatherstrip 4 mounted with the clip 1, a seal lip 8 made of an elastic material is molded relative to a core metal 7 formed of metal with a roughly C-shape cross section. A weatherstrip side member 5 to be directly attached to the weatherstrip 4 includes: a pair of arms 10 having a V-shape and engaging one of hemming portions 9 at both sides of the weatherstrip 4 in a width direction; a base portion 11 of the arms; and a pair of tabular engagement pieces 12 extending from both sides of the base portion 11 of the arms in a direction perpendicular to a flat surface where the arms 10 project. The weatherstrip side member 5 is integrally formed of a relatively elastic material such as, for example, polyacetal.

As shown in FIG. 2, multiple claws 13 (four claws at one side in the present embodiment) are formed on each of the tabular engagement pieces 12 to form steps, each being notched therearound to be elastically deformable.

On the other hand, the window frame side member 6 is formed of a high heat resistance material, for example, fiberglass reinforced polybutylene terephthalate, and is integrated with a pair of box-shape holding portions 14 for receiving the pair of the tabular engagement pieces 12 to slide therein respectively; and an attachment portion 16 to be attached to a T stud 15 projecting on the window frame surface 3. The pair of the box-shape holding portions 14 is provided with rectangular holes 17 for engaging the claws 13 formed on the tabular engagement pieces 12 of the weatherstrip side member 5. Engagement means is composed of the holes 17 and the claws 13.

The attachment portion 16 to be attached to the T stud 15 is formed on a surface opposite to the window frame surface 3 at the middle in a direction of the window frame side member 6 along the window frame surface 3 (a longitudinal direction) between the pair of the box-shape holding portions 14. On the T stud attachment portion 16, as in a clip well known in the art, there are formed a U-shaped groove 18 for receiving an axis portion except an enlarged head of the T stud 15; and a tongue piece 19 for abutting against an enlarged head 15a of the T stud 15 in a state where the T stud 15 is received in the groove 18 to prevent the window frame side member 6 from coming off the T stud 15. Incidentally, the tongue piece 19 deforms with elasticity of a material itself when the enlarged head 15a is pushed in.

As shown in FIG. 3, attachment sides 21 for attaching double-sided adhesive tapes 20 are formed at both sides relative to the T stud attachment portion 16, i.e. on surfaces of the box-shape holding portions 14 opposite to the window frame surface 3. Since the window frame side member 6 is formed of a high heat resistance material, the window frame side member 6 can withstand a curing temperature, even if a thermoset adhesive is used for the double-sided adhesive tapes 20. Attachment means of the window frame side member 6 relative to the window frame surface 3 is composed of the T stud attachment portion 16 and the double-sided adhesive tapes 20. As means for attaching the window frame side member 6 to the window frame surface 3, one of the T stud 15 and the double-sided adhesive tapes 20 is appropriately selected according to a position of the window frame.

The multiple claws 13 provided on the tabular engagement pieces 12 are disposed in a staircase pattern in a moving direction when the tabular engagement pieces 12 slide relative to the box-shape holding portions 14. With this configuration, since it is possible to change a depth that the tabular engagement pieces 12 enter in the box-shape holding portions 14 in stages, it is easy to align a position of the weatherstrip 4 relative to a difference in positions between an outer surface of the front window shield 2 and the window frame surface 3.

Projections 22 capable of elastically abutting against the window frame surface 3 are formed on both ends of the window frame side member 6 in the longitudinal direction. It is arranged that a projecting size of an end of the projection 22 from the attachment surface 21 of the double-sided adhesive tape is smaller than a thickness of the double-sided adhesive tape 20. With this configuration, it is possible to prevent rattling when the window frame side member 6 is fixed to the T stud 15, and also the projections 22 do not interfere when the double-sided adhesive tapes 20 are used.

Grooves 23 are formed on surfaces of the window frame side member 6 parallel to the window frame surface 3 in a direction perpendicular to the longitudinal direction of the window frame. With this configuration, since the attachment surface 21 for the double-sided adhesive tape can bend around the groove 23, it is possible to improve an ability of the attachment surface 21 to follow the window frame surface 3 in the longitudinal direction of the window frame side member 6, so that the attachment surface 21 for the doubled-surfaced adhesive tape is more closely attached to the window frame surface 3 especially when the double-sided adhesive tape 20 is used.

As described above, according to the present invention, it is possible to form the weatherstrip side member and the window frame side member separately, and integrate them easily. Therefore, when the window frame side member is formed of a high heat resistance material, both the thermoset adhesive and the T stud can be used at the same time, thereby reducing the number of the parts and simplifying part management effectively.

Also, when the claws formed between the engagement pieces and the holding portions are provided at the multiple positions in the moving direction when the engagement pieces are connected to the holding portions, the claws can correspond to the size difference between the engagement position for the weatherstrip and the attachment position for the window frame.

Further, the projections capable of elastically abutting against the window frame surface are formed on the ends of the window frame side member in the longitudinal direction, and it is arranged that a projecting size of an end of the projection from the attachment surface of the double-sided adhesive tape is smaller than a thickness of the double-sided adhesive tape. Therefore, it is possible to prevent the rattle prevention means fixed to the T stud from interfering when the double-sided adhesive tape is used.

Further, the grooves are provided on at least one of the surfaces of the window frame side member parallel to the window frame surface in a direction perpendicular to the longitudinal direction of the window frame. Therefore, it is possible to secure the ability of following the window frame surface in the longitudinal direction.

While the invention has been explained with reference to the specific embodiments of the invention, the explanation is illustrative and the invention is limited only by the appended claims.

What is claimed is:

1. A clip for mounting a weatherstrip between a window and a window frame, comprising:
   a weatherstrip side member to be attached to the weatherstrip and including an elongated arm with flexibility for engaging the weatherstrip having a base portion, and an engagement piece extending from the base portion of the arm and oriented substantially perpendicularly to the arm,
   a window frame side member to be attached to the window frame and including a holding portion for receiving the engagement piece to slide therein, and attachment means for attaching the window frame side member to the window frame, and
   engagement means situated between the engagement piece of the weatherstrip side member and the holding portion of the window frame side member for engaging the same.

2. A clip for mounting a weatherstrip according to claim 1, wherein said engagement means includes a claw formed on one of the engagement piece and the holding portion, and a hole formed on the other of the engagement piece and the holding portion for receiving the claw.

3. A clip for mounting a weatherstrip according to claim 2, wherein said engagement piece of the weatherstrip side member is formed in a plate shape, and said holding portion of the window frame side member is formed in a box shape to receive the engagement piece therein.

4. A clip for mounting a weatherstrip according to claim 3, wherein said attachment means of the window frame side member includes an attachment portion for attaching to a T stud formed on the window frame and a double-sided adhesive tape.

5. A clip for mounting a weatherstrip according to claim 1, wherein said attachment means of the window frame side member includes an attachment portion for attaching to a T stud formed on the window frame and a double-sided adhesive tape.

6. A clip for mounting a weatherstrip according to claim 2, wherein said claw situated between the engagement piece and the holding portion includes claw members formed at multiple positions spaced laterally and along a direction that the engagement piece slides in the holding portion.

7. A clip for mounting a weatherstrip according to claim 1, wherein said weatherstrip side member further includes an additional arm extending from the base portion so that the arm and the additional arm project from the base portion to gradually increase a space therebetween.

8. A clip for mounting a weatherstrip according to claim 1, wherein said weatherstrip side member is a member formed separately from the weatherstrip to independently support the weatherstrip.

9. A clip for mounting a weatherstrip according to claim 1, wherein said window frame side member includes a groove on at least one of a front side surface and a backside surface thereof, said groove extending in a direction perpendicular to a longitudinal direction of the window frame.

10. A clip for mounting a weatherstrip between a window and a window frame, comprising:
    a weatherstrip side member to be attached to the weatherstrip and including an arm for engaging the weatherstrip having a base portion, and an engagement piece having a plate shape and extending from the base portion of the arm,
    a window frame side member to be attached to the window frame and including a holding portion having a box shape for receiving the engagement piece to slide therein, attachment means for attaching the window frame side member to the window frame, said attachment means having an attachment portion for attaching to a T stud formed on the window frame and a double-sided adhesive tape, and projections at lateral ends in a longitudinal direction thereof for elastically abutting against the window frame, said projections projecting from a backside surface by a distance smaller than a thickness of the double-sided adhesive tape, and
    engagement means situated between the engagement piece of the weatherstrip side member and the holding portion of the window frame side member for engaging the same, said engagement means including a claw formed on one of the engagement piece and the holding portion, and a hole formed on the other of the engagement piece and the holding portion for receiving the claw.

11. A clip for mounting a weatherstrip according to claim 10, wherein said weatherstrip side member further includes an additional engagement piece arranged such that the engagement piece and the additional engagement piece sandwich the base portion therebetween, and said window frame side member further includes an additional holding portion for slidably receiving the additional engagement piece.

* * * * *